Patented Feb. 19, 1946

2,395,025

UNITED STATES PATENT OFFICE 2,395,025

POLISHES AND METHOD OF MAKING THEM

Helen E. Wassell, Pittsburgh, Pa., assignor to Carbide and Carbon Chemicals Corporation, a corporation of New York No Drawing. Application October 8, 1941, Serial No. 414,097

9 Claims. (Cl. 106—8)

This invention relates to self-lustering or bright-drying emulsion-type polishes containing wax in aqueous dispersion, and to methods of preparing them.

Aqueous dispersions adapted to serve as self-lustering polishes usually contain a hard wax, such as carnauba wax, dispersed in water by the aid of a basic-reacting emulsifying agent. These self-lustering polishes are ordinarily prepared by first forming a molten wax mixture containing the melted wax and the emulsifying agent, and then adding boiling water to the molten wax mixture, although the wax mixture may also be introduced into the boiling water. In order that the wax may be uniformly distributed in the form of fine particles throughout the resultant product, the molten wax mixture and the boiling water are stirred to a degree adequate for intimate mixing while the wax is being thus dispersed in the water. However, when the principal ingredients of the self-lustering polishes are only the wax and the emulsifying agent in aqueous dispersion, films formed from the polishes may have a tendency to dry streakily. To diminish this tendency, various materials including shellac and other natural resins, fossil resins, and the like have been added to the polish, after the wax has been dispersed in water, for the purpose of improving the appearance of the dried films. Unless the dispersion of the wax in the water is always carried out under substantially identical conditions, the completed polish may also display variations from batch to batch in certain of its characteristics, for instance, in the viscosity and translucency of the emulsion itself, and in the luster and the evenness of the dried films. These variations may be due, at least in part, to differences in the care and attention given to the dispersing of the wax in the water, particularly in cases where batches are prepared by different operators. Even though differences between films from various polishes, or batches of polishes, are not readily detectable except by comparison of the polishes, or their dried films, by special tests selected to emphasize these differences, such variations in quality are regarded as objectionable to the extent that they may interfere with the standardizing of a product on the basis of such characteristics as viscosity, translucency and the like of the polish, and evenness and luster of the polish film, or to require compensating deviations from routine procedures for the production of a standardized product.

I have found that by adding a highly surface-active wetting agent to the molten wax mixture, containing a basic-reacting emulsifying agent, the molten wax may be more quickly and easily dispersed in the boiling water to produce uniformly superior aqueous wax emulsions of relatively low viscosities. The polishes thus produced spread relatively evenly when applied to surfaces and, on drying, deposit lustrous films which are relatively free from objectionable streakiness.

In accordance with the present invention, the surface-active wetting agent is brought into admixture with the melted wax before the wax is dispersed in the boiling water, and prior to the addition of any water to the wax, at least in any substantial amount. The surface-active wetting agent may be added to the melted wax, or to the molten wax mixture containing the emulsifying agent. However, the surface-active wetting agent may first be mixed with the emulsifying agent and this mixture then added to the melted wax containing the fatty acid. For best results the surface-active wetting agent should be uniformly distributed by stirring or mixing the molten wax mixture, and thereafter the wax may be dispersed in water by introducing the water at its boiling temperature into the molten wax mixture. If desired, the molten wax mixture containing the surface-active wetting agent may be poured into boiling water, or the wax may be dispersed by other suitable manipulation.

A large number of surface-active wetting agents are useful in making the emulsion-type polishes in accordance with the present invention. For best results it is essential that the surface-active wetting agent be relatively stable in the presence of the basic-reacting emulsifying agent for the wax, particularly under the conditions encountered in making the polishes. I have found that such salts of oxysulfur organic compounds as are highly surface active and relatively stable give excellent results. These salts include those of the sulfated high molecular weight alcohols, sulfonated esters of dibasic acids and higher alcohols, and alkylated aryl sulfonates. Salts of the sulfate ester derivatives of the higher saturated, branched-chain aliphatic alcohols, including both the primary and secondary alcohols are especially suitable. These sulfate ester salts may be those of the alkali metal hydroxides, the ethanolamines and of other bases. Sulfate ester derivatives of the higher saturated branched-chain aliphatic alcohols are described in U. S. Patent 2,088,019.

Other salts of oxysulfur organic compounds which may be used with excellent results include salts of various sulfated higher fatty alcohols obtained from fats and oils of animal and vegetable origin, salts of the alkylated aryl sulfonates, and salts of the dialkyl esters of sulfosuccinic acid such as, for example, the dioctyl ester and the dihexyl ester of sodium sulfosuccinic acid. Surface-active wetting agents which are phosphated organic compounds are also contemplated. In general, good results may be obtained with surface-active wetting agents having from eight to twenty carbon atoms to the molecule. Salts of the sulfate ester derivatives of the saturated branched-chain aliphatic alcohols are preferred, however, and exceptionally good results were obtained with those having eight to seventeen carbon atoms to the molecule.

The amount of surface-active wetting agent used in accordance with the present invention is small in relation to the finished polish, and the actual range of proportions required is dependent, among other things, upon the effectiveness of the particular surface-active wetting agent employed. In general, the amount of surface-active wetting agent may be about 0.1 to 2.0 per cent of the total weight of the finished emulsion, but larger or smaller amounts may be used. Based on the wax content of the polish, the amount of surface-active wetting agent is preferably about 0.7 to 15 per cent by weight of the wax. Usually with carnauba wax No. 3, less surface-active wetting agent is required as compared with the amount used in dispersing yellow carnauba wax No. 1.

The basic-reacting emulsifying agents for the wax may be soaps formed from a higher fatty acid and a suitable amine. Suitable amine soaps or salts of higher fatty acids may be formed from a large number and variety of amine compounds of relatively low molecular weight containing hydrogen, oxygen, basic nitrogen and from two to six and more carbon atoms to the molecule. Preferably the soaps are formed from amines such as diethylamino ethanol, morpholine, N-methyl morpholine, the ethanolamines, isopropanolamines or other alkylolamines and the like in combination with a higher fatty acid including, for example, oleic, palmitic, stearic, ricinoleic, linoleic or other fatty acid of the type obtained from oils or fats of vegetable or animal origin.

The most suitable waxes are the hard waxes, such as carnauba. Mixtures of carnauba with other natural and synthetic waxes may also be used, but as a rule softer waxes may be added or substituted in only limited amounts without adversely affecting the luster or texture, or both, of the polish film. Candelilla wax, vegetable waxes which are at least fairly hard, beeswax and high melting hydrocarbon waxes may be used in place of carnauba wax in amounts of from about 20 to 30 per cent of the total wax to produce satisfactory polishes. However, the resulting polish films are usually a little softer than, or do not have the high luster of the straight carnauba wax polish film.

When a self-lustering polish is prepared by stirring the boiling water into the mixture of molten wax and the basic-reacting emulsifying agent, the mixture becomes progressively more viscous as the water content increases. Along with the increase in viscosity, it becomes progressively more difficult to stir the water thoroughly into the resultant mass. Hence, in order that the wax may be distributed in a finely-divided state in the polish, it is usually desirable to add the boiling water relatively slowly at the start so as to permit the water to be incorporated uniformly throughout the viscous mass by stirring.

Immediately upon introducing the boiling water into the molten wax mixture, to which has been added a small amount of surface-active wetting agent in accordance with the present invention, there is produced a low-viscosity-type emulsion which is thin enough at all times for the water to be stirred in easily, regardless of the rate at which the boiling water is added. The self-lustering polish thus produced is uniform whether the water is stirred into the wax mixture slowly or rapidly, or whether the molten wax mixture, containing the surface-active wetting agent, is stirred into the boiling water. However, if the boiling water is to be stirred into the molten wax mixture relatively slowly, less surface-active wetting agent may be used than if the water is to be stirred in rapidly, in order to produce similar dispersions of the wax in water. The use of a surface-active wetting agent in accordance with the present invention has the additional advantage in that a substantially shorter time is required to disperse the wax in the making of self-lustering polishes.

The dried films of the emulsion polishes thus produced are free from objectionable streakiness and, in appearance, are more nearly even than dried films of otherwise similar emulsions made without the surface-active wetting agent.

In the case of self-lustering polishes of the so-called water-resistant type (that is, polishes adapted to deposit films which, on drying, are relatively resistant to spotting or removal of the film by water), the use of a surface-active wetting agent, in accordance with the present invention, does not result in any noticeable decrease in the water-resistance of the dried film. However, when a surface-active wetting agent is added to a water-resistant, self-lustering polish after the wax has been dispersed in water, the water-resistance of the film is decreased and any substantial resultant improvement in the appearance of the dried film is obtained at the expense of water-resistance.

*Example I*

| | Parts by weight |
|---|---|
| Carnauba wax (No. 1 yellow) | 40 |
| Oleic acid | 8 |
| Morpholine | 5 |
| Surface-active wetting agent | 1.5 |
| Water | 240 |

The carnauba wax was carefully melted in a steam jacketed kettle operated to maintain a temperature of about 95° to 100° C. to avoid overheating the wax. The oleic acid was added to the wax to hasten the melting. The morpholine and surface-active wetting agent were then added to the melted wax mixture, and the mixture stirred for about three minutes or until a clear solution was obtained. In this example the surface-active wetting agent used was an aqueous solution containing 40 per cent by weight of sodium octyl sulfate (mono-sodium sulfate ester derivative of 2-ethyl hexanol-1). The temperature of the hot wax mixture was about 95° to 98° C.

Then the water, heated to 98° to 100° C., was added quickly, all at one time, to the molten wax mixture containing the surface-active wetting agent. After stirring for several minutes, a homogeneous dispersion was obtained. Upon the addition of the water, the wax mixture dispersed very quickly, with a minimum of stirring, to produce a low viscosity emulsion. The polish was then covered to avoid caking on the surface, and cooled externally with water with occasional stirring. If desired, the polish may be covered and allowed to cool more slowly without the use of an external coolant. Films, deposited from the polish, dried more nearly even and without decrease in water-resistance as compared with a similar polish in which the surface-active wetting agent was not used.

*Example II*

The emulsion of this example was prepared similarly to the dispersion of Example I, except that an aqueous solution containing 25 per cent by weight of sodium heptadecyl sulfate (sodium sulfate ester derivative of 3,9 diethyl tridecanol-6), was used as the penetrant instead of the 40 per cent solution of sodium octyl sulfate.

The dried films from this emulsion were lustrous, free from objectionable streakiness, and resistant to reemulsification by water as in the case of Example I.

A number of polishes were prepared using various amounts of the surface-active wetting agent of this example. Good results were obtained using amounts both larger and smaller than given in the formula of Example I, and the sodium heptadecyl seemed to be more efficient than sodium octyl sulfate, in that a less amount of the sodium heptadecyl sulfate could be used for equivalent results.

*Example III*

Except that an aqueous solution containing 25 per cent by weight of sodium tetradecyl sulfate (sodium sulfate ester derivative of 7-ethyl, 2-methyl undecanol-6), was used as the surface-active wetting agent instead of the 40 per cent solution of sodium octyl sulfate, the dispersion of this example was prepared in the same way, and with the same proportions of ingredients as given in Example I. The product of this example was similar to that of Example II in such characteristics as low viscosity and opacity of the emulsion, and a high degree of evenness and luster of the dried film.

A number of polishes were prepared using larger and smaller amounts of the surface-active wetting agent, and it was found that the sodium tetradecyl sulfate of this example had the additional advantage that the use of a large excess did not affect the evenness of the dried polish film as much as did the same excess of the sodium heptadecyl sulfate of Example II.

*Example IV*

Using the same proportions of the ingredients of Example III, the wax was dispersed by stirring the wax mixture, heated to 95° to 98° C. and containing the sodium tetradecyl sulfate penetrant, quickly, all at one time, into the hot water which was at 98° to 100° C. After stirring for several minutes, a homogeneous dispersion of low viscosity resulted. The emulsion was covered and allowed to cool with occasional stirring. If desired, a coolant may be used. The dried films deposited by this product were more nearly even than films from polishes prepared without the aid of a surface-active wetting agent for dispersing the wax. Emulsions prepared according to Examples III and IV generally are preferred.

*Example V*

| | Parts by weight |
|---|---|
| Carnauba wax (No. 1 yellow) | 40 |
| Oleic acid | 8 |
| Amine mixture | 3 |
| Surface-active wetting agent | 1.5 |
| Water | 240 |

The wax and the oleic acid were melted and the amine and the surface-active wetting agent stirred in. The amine consisted of a mixture of equal parts by weight of morpholine and monoethanolamine, and the surface-active wetting agent was an aqueous solution containing 25 per cent by weight of the sodium ester sulfate derivative of 7-ethyl, 2-methyl undecanol-6. Stirring was continued for about three minutes with the mixture at a temperature of about 95° C., and the boiling water added quickly, all at one time. Stirring was then continued until a homogeneous dispersion of the wax in water resulted. The polish was then covered to avoid caking on the surface, and cooled externally with water, with occasional stirring. If desired, the polish may be covered and permitted to cool more slowly without the use of an external coolant. The finished polish was opaque and of a desirably low viscosity. The polish spread easily on surfaces, and the films on drying were lustrous and even, and resistant to spotting and removal by water.

*Example VI*

The amine used in this example consisted of a mixture of 40 parts morpholine, 30 parts triethanolamine, and 30 parts monoethanolamine, by weight.

| | Parts by weight |
|---|---|
| Carnauba wax (No. 1 yellow) | 40 |
| Oleic acid | 8 |
| Amine mixture | 3.5 |
| Surface-active wetting agent | 1.5 |
| Water | 240 |

The polish was prepared by the same procedure described for dispersing the wax in Example V, using the same surface-active wetting agent. The polish produced better films than polish made in the same manner without the use of the surface-active wetting agent. The dried films of the polish of this example were even, lustrous and resistant to spotting and removal by water.

*Example VII*

The polish of this example was prepared in the same way as those of Examples V and VI, and the formula differed only in that for the amine mixture there was used 4.5 parts by weight of a mixture of monoethanolamine, 40 parts, and triethanolamine, 60 parts, by weight. This polish also produced lustrous, even films which were better than the films of polishes made in the same way but without the use of a surface-active wetting agent. The dried films were no less resistant to spotting and removal by water than similar polishes prepared without the aid of the surface-active wetting agent.

*Example VIII*

The surface-active wetting agent used in this example was an aqueous solution containing 25 per cent by weight of the dioctyl ester of sodium sulfosuccinic acid. The proportions were as follows:

| | Parts by weight |
|---|---|
| Carnauba wax (No. 1 yellow) | 40 |
| Oleic acid | 8 |
| Morpholine | 5 |
| Surface-active wetting agent | 2 |
| Water | 240 |

The polish was prepared by a procedure similar to that described in Example V. The dried films of this polish were better than those produced from polishes made without the surface-active wetting agent, but otherwise prepared in the same manner. Films deposited from the polish were no less water-resistant and dried more nearly even as compared with films of a similar polish in which the surface-active wetting agent was not used. With decreasing amounts of the surface-active wetting agent of this example, the films dried more streakily and with diminished luster.

Example IX

In this example, 0.75 part by weight of the dihexyl ester of sodium sulfosuccinic acid was substituted for the surface-active wetting agent in the formula of Example VIII. This polish also was prepared according to the method described in Example V. It produced better films than polish made in the same manner but without the surface-active wetting agent. Films deposited from the polish dried more nearly even as compared with films of a similar polish prepared without the use of the wetting agent, and the dried films were no less water-resistant. Similar results also were obtained using 30 per cent more or 30 per cent less of this wetting agent.

Example X

The polish of this example was prepared according to the method of Example V, using as the surface-active wetting agent 1.5 parts by weight of a wetting agent which is a phosphated organic compound. The proportions of the remaining ingredients were as given in the formula of Example VIII. The dried films from this polish were no less water-resistant than those produced from a similar polish made without the aid of the surface-active wetting agent. Also the films deposited from this polish dried more nearly even. Polishes were also made using smaller amounts of the wetting agent, but the dried films tended to be less even than the polish of this example.

Example XI

| | Parts by weight |
|---|---|
| Carnauba wax (No. 1 yellow) | 40 |
| Oleic acid | 6.8 |
| Morpholine | 6.8 |
| Borax | 2 |
| Surface-active wetting agent | 1 |
| Water | 240 |

The wax was melted in admixture with the oleic acid at a temperature of about 95° to 98° C., and the morpholine stirred in. The stirring was continued for about three minutes or until a clear solution was obtained.

Meanwhile a solution of the borax and the wetting agent was freshly prepared by dissolving the borax in about 15 parts by weight of boiling water at about 98° to 100° C. and then adding the wetting agent, which in this example was an aqueous solution containing 25 per cent by weight of sodium tetradecyl sulfate (sodium sulfate ester derivative of 7-ethyl, 2-methyl undecanol-6). As soon as a clear solution of the wax mixture was obtained, the borax-wetting agent solution was stirred in, and the stirring continued for about three minutes at a temperature of about 95° C. The remainder of the water was then added quickly, all at one time, with the temperature of the water at about 98° to 100° C. during the addition. The resultant emulsion was cooled as previously described in Example I. Films deposited from this polish dried evenly with a good luster, and were no less water-resistant than similar polishes in which the wetting agent as not employed.

The viscosities of the polishes of the foregoing examples were compared by noting the time required for the polish to drain from a mark on the upper stem to an arbitrarily selected mark on the lower stem of a 20 ml. pipette. The same pipette was used in all the tests. Polishes prepared in accordance with the present invention have been found to drain in 20 seconds or less.

In contrast thereto, the draining times of polishes containing no surface-active wetting agent, but otherwise prepared in accordance with the procedures described in the foregoing examples, may vary considerably. In general, the draining time has been found to range from 50 to 85 seconds, using various lots of No. 1 carnauba wax. For instance, when no wetting agent was used in making a polish as described in Example IV, the resultant emulsion was found to have a draining time of about 85 seconds.

Example XII

If desired, there may be added to the product of the foregoing examples a resin dispersion of the following composition:

| | Parts by weight |
|---|---|
| Manila Loba B resin (powdered) | 7 |
| Ammonia (28%) | 0.8 |
| Triethanolamine | 0.8 |
| Morpholine | 0.8 |
| Water | 64 |

The ammonia, morpholine and triethanolamine were dissolved in about one-half the above amount of water. The powdered resin was then stirred in, the mixture warmed to about 50° to 60° C., and held at this temperature for about fifteen minutes with constant stirring. After stirring in the remainder of the water, heated to about 50° C., the resulting solution was cooled. If the solution is not clear, small amounts of ammonia may be stirred in until clarity is obtained. Any small amount of undispersed material can be allowed to settle and the solution drawn off, or the dispersion can be strained through several thicknesses of cheese cloth.

Instead of the Manila Loba B resin dispersion of Example XII, there may be added to the wax dispersions of Examples I to XI, a suitable proportion of a shellac dispersion prepared by warming together about 7 parts of shellac in about 1 part of morpholine and about 64 parts of water.

The addition of resin dispersion, as illustrated by this example, to polishes prepared in accordance with this invention serves primarily to reduce the cost of the polish. However, resin or shellac dispersions are of little or no assistance in improving the appearance of films from polishes prepared in accordance with the present invention, and the films are usually superior in luster and smoothness as compared with films from polishes made without the addition of the surface-active wetting agents to which a resin dispersion has also been added.

The foregoing examples are illustrative in nature of the method of using highly surface-active wetting agents or penetrants as an aid in dispersing wax in preparing self-lustering emulsion-type polishes, and the products are representative of other wax dispersions suitable for use as self-lustering emulsion-type polishes within the scope of the present invention.

I claim:

1. In the manufacture of a self-lustering, aqueous emulsion-type wax polish, the process of emulsifying the wax while maintaining a low viscosity of fluid during emulsification and avoiding the formation of an intermediate water-in-wax emulsion stage which includes forming a wax mixture containing a hard wax in a molten state, a basic-reacting emulsifying agent and a relatively small amount of a highly surface-active wetting agent which is stable in the presence of the emulsifying agent and favors the dispersion of the wax in water directly upon the addition of water, while preventing the formation of a water-in-wax emulsion, said wetting agent being a sulfated aliphatic alcohol having at least 8 carbon atoms to the molecule and said wax mixture being formed prior to the addition of water to the wax in an amount sufficient for dispersion of the wax therein; and thereafter bringing said wax into admixture with an amount of water greater than the amount of wax by weight and intimately stirring the wax and the water to disperse the wax therein for the first time from said wax mixture and in the presence of said wetting agent.

2. In the manufacture of a self-lustering, aqueous emulsion-type wax polish, the process of emulsifying the wax while maintaining a low viscosity of fluid during emulsification and avoiding the formation of an intermediate water-in-wax emulsion stage which includes forming a wax mixture containing a hard wax in a molten state, a basic-reacting emulsifying agent having as an ingredient thereof a soap which is a salt of a higher fatty acid, and a relatively small amount of a highly surface-active wetting agent which is stable in the presence of the emulsifying agent and favors the dispersion of the wax in water directly upon the addition of water while preventing the formation of a water-in-wax emulsion, said wetting agent being a sulfated aliphatic alcohol having at least 8 carbon atoms to the molecule and said wax mixture being formed prior to the addition of water to the wax in an amount sufficient for dispersion of the wax therein; and thereafter bringing said wax into admixture with an amount of water greater than the amount of wax by weight and intimately stirring the wax and the water to disperse the wax therein for the first time from said wax mixture and in the presence of said wetting agent, said small amount of wetting agent being about 0.1 to 2.0 per cent by weight of the resultant aqueous dispersion.

3. In the manufacture of a self-lustering, aqueous emulsion-type wax polish, the process of emulsifying the wax while maintaining a low viscosity of fluid during emulsification and avoiding the formation of an intermediate water-in-wax emulsion stage which includes forming a wax mixture containing a hard wax in a molten state, a basic reacting emulsifying agent having as an ingredient thereof a soap which is a salt of a higher fatty acid and a relatively small amount of a highly surface-active wetting agent which is stable in the presence of the emulsifying agent and favors the dispersion of the wax in water directly upon addition of water while preventing the formation of a water-in-wax emulsion, said wetting agent being a sulfated aliphatic alcohol having from eight to twenty carbon atoms to the molecule and said wax mixture being formed prior to the addition of water to the wax in an amount sufficient for dispersion of the wax therein; and thereafter bringing said wax into admixture with an amount of water greater than the amount of wax by weight and intimately stirring the wax and the water to disperse the wax therein for the first time from said wax mixture and in the presence of said wetting agent, said small amount of wetting agent being about 0.1 to 2.0 per cent by weight of the resultant aqueous dispersion.

4. In the manufacture of a self-lustering, aqueous emulsion-type wax polish, the process of emulsifying the wax while maintaining a low viscosity of fluid during emulsification and avoiding the formation of an intermediate water-in-wax emulsion stage which includes forming a wax mixture containing a hard wax in a molten state, a basic reacting emulsifying agent having as an ingredient thereof a soap which is a salt of a higher fatty acid and a relatively small amount of a highly surface-active wetting agent which is a salt of a higher aliphatic alcohol sulfate, said salt being stable in the presence of the emulsifying agent and favoring the dispersion of the wax in water directly upon addition of water while preventing the formation of a water-in-wax emulsion, said wax mixture being formed prior to the addition of water to the wax in an amount sufficient for dispersion of the wax therein; and thereafter bringing said wax into admixture with an amount of water greater than the amount of wax by weight and intimately stirring the wax and the water to disperse the wax therein for the first time from said wax mixture and in the presence of said wetting agent, said small amount of wetting agent being about 0.1 to 2.0 per cent by weight of the resultant aqueous dispersion.

5. In the manufacture of a self-lustering, aqueous emulsion-type wax polish, the process of emulsifying the wax while maintaining a low viscosity of fluid during emulsification and avoiding the formation of an intermediate water-in-wax emulsion stage which includes forming a wax mixture containing a hard wax in a molten state, a basic-reacting emulsifying agent having as an ingredient thereof a soap which is a salt of a higher fatty acid and a relatively small amount of a highly surface-active wetting agent which is an alkali metal salt of a higher aliphatic alcohol sulfate, said salt being stable in the presence of the emulsifying agent and favoring the dispersion of the wax in water directly upon addition of water while preventing the formation of a water-in-wax emulsion, said wax mixture being formed prior to the addition of water to the wax in an amount sufficient for dispersion of the wax therein; and thereafter bringing said wax into admixture with an amount of water greater than the amount of wax by weight and intimately stirring the wax and the water to disperse the wax therein for the first time from said wax mixture and in the presence of said wetting agent, said small amount of wetting agent being about 0.1 to 2.0 per cent by weight of the resultant aqueous dispersion.

6. In the manufacture of a self-lustering, aqueous emulsion-type wax polish, the process of emulsifying the wax while maintaining a low viscosity of fluid during emulsification and avoiding the formation of an intermediate water-in-wax emulsion stage which includes forming a wax mixture containing a hard wax in a molten state, a basic reacting emulsifying agent having as an ingredient thereof a soap which is a salt of a higher fatty acid and a relatively small amount of a highly surface-active wetting agent which is a salt of a sulfate ester of an aliphatic alcohol having at least eight carbon atoms to the molecule, said salt being stable in the presence of the emulsifying agent and favoring the dispersion of the wax in water directly upon addition of water while preventing the formation of a water-in-wax emulsion, said wax mixture being formed prior to the addition of water to the wax in an amount sufficient for dispersion of the wax therein; and thereafter bringing said wax into admixture with an amount of water greater than the amount of wax, by weight, and intimately stirring the wax and the water to disperse the wax therein for the first time from said wax mixture and in the presence of said wetting agent, said small amount of wetting agent being about 0.1 to 2.0 per cent by weight of the resultant aqueous dispersion.

7. In the manufacture of a self-lustering, aqueous emulsion-type wax polish, the process of emulsifying the wax while maintaining a low viscosity of fluid during emulsification and avoiding the formation of an intermediate water-in-wax emulsion stage which includes forming a wax mixture containing a hard wax in a molten state, a basic-reacting emulsifying agent having as an ingredient thereof a soap formed from a higher fatty acid and a relatively low molecular weight compound containing hydrogen, oxygen, basic nitrogen and not less than two carbon atoms to the molecule, and a relatively small amount of a highly surface-active wetting agent which is a salt of a sulfate ester of an aliphatic alcohol having at least eight carbon atoms to the molecule, said salt being stable in the presence of the emulsifying agent and favoring the dispersion of the wax in water directly upon the addition of water, while preventing the formation of a water-in-wax emulsion, said wax mixture being formed prior to the addition of water to the wax in an amount sufficient for dispersion of the wax therein; and thereafter bringing said wax into admixture with an amount of water greater than the amount of wax by weight and intimately stirring the wax and the water to disperse the wax therein for the first time from said wax mixture and in the presence of said wetting agent, said small amount of wetting agent being about 0.1 to 2.0 per cent by weight of the resultant aqueous dispersion.

8. In the manufacture of a self-lustering, aqueous emulsion-type wax polish, the process of emulsifying the wax while maintaining a low viscosity and avoiding the formation of an intermediate water-in-wax emulsion stage which includes forming a wax mixture containing a hard wax, a basic-reacting emulsifying agent having as an ingredient thereof a soap formed from a higher fatty acid and a compound containing hydrogen, oxygen, basic nitrogen and from two to six carbon atoms to the molecule and a relatively small amount of a highly surface-active wetting agent which is an alkali metal salt of a sulfate ester of a branched chain secondary aliphatic alcohol having from eight to twenty carbon atoms to the molecule, said salt being stable in the presence of the emulsifying agent and favoring the dispersion of the wax in water directly upon the addition of water while preventing the formation of a water-in-wax emulsion, said wax mixture being formed prior to the addition of water to the wax in an amount sufficient for dispersion of the wax therein; and thereafter bringing said wax into admixture with an amount of water greater than the amount of wax by weight and intimately stirring the wax and the water to disperse the wax therein for the first time from said wax mixture and in the presence of said wetting agent, said small amount of wetting agent being about 0.1 to 2.0 per cent by weight of the resultant aqueous dispersion.

9. In the manufacture of a self-lustering, aqueous emulsion-type wax polish, the process of emulsifying the wax while maintaining a low viscosity and avoiding the formation of an intermediate water-in-wax emulsion stage which includes forming a wax mixture containing a hard wax, a basic-reacting emulsifying agent, having as an ingredient thereof a soap formed from a higher fatty acid and a compound containing hydrogen, oxygen, basic nitrogen and from two to six carbon atoms to the molecule and a relatively small amount of a highly surface-active wetting agent which is an alkali metal salt of a sulfate ester of a branched chain aliphatic alcohol having from fourteen to seventeen carbon atoms to the molecule, said salt being stable in the presence of the emulsifying agent and favoring the dispersion of the wax in water directly upon the addition of water while preventing the formation of a water-in-wax emulsion, said wax mixture being formed prior to the addition of water to the wax in an amount sufficient for dispersion of the wax therein; and thereafter bringing said wax into admixture with an amount of water greater than the amount of wax by weight and intimately stirring the wax and the water to disperse the wax therein for the first time from said wax mixture and in the presence of said wetting agent, said small amount of wetting agent being about 0.1 to 2.0 per cent by weight of the resultant aqueous dispersion.

HELEN E. WASSELL.